(12) United States Patent
Naumenko et al.

(10) Patent No.: US 10,610,912 B2
(45) Date of Patent: Apr. 7, 2020

(54) METHOD FOR DECONTAMINATING SOIL, AND INSTALLATION FOR IMPLEMENTING SAME

(71) Applicant: OBSHHESTVO S OGRANICHENNOJ OTVETSTVENNOST'JU "KORPORACIJA PO JADERNYM KONTEJNERAM", Moscow (RU)

(72) Inventors: Nikolaj Aleksandrovich Naumenko, Moscow (RU); Vjacheslav Sergeevich D'jakov, Moscow (RU); Ul'jana Sergeevna Nikulina, Glazov (RU); Svetlana Vladimirovna Chizhevskaja, Moscow (RU); Anna Sergeevna Chernikova, Moscow (RU); Mihail Vladimirovich Radchenko, Moscow (RU); Irina Nikolaevna Nenartovich, Moscow (RU)

(73) Assignee: OBSHHESTVO S ORGANICHENNOJ OTVETSTVENNOST'JU "KORPORACIJA PO JADERNYM KONTEJNERAM", Moscow (RU)

( * ) Notice: Subject to any disclaimer, the term of this patent is extended or adjusted under 35 U.S.C. 154(b) by 0 days.

(21) Appl. No.: 15/503,016

(22) PCT Filed: Sep. 3, 2015

(86) PCT No.: PCT/RU2015/000557
§ 371 (c)(1),
(2) Date: Feb. 10, 2017

(87) PCT Pub. No.: WO2016/024889
PCT Pub. Date: Feb. 18, 2016

(65) Prior Publication Data
US 2017/0232489 A1    Aug. 17, 2017

(30) Foreign Application Priority Data
Aug. 11, 2014  (RU) .................. 2014132935

(51) Int. Cl.
*B09C 1/00* (2006.01)
*B09C 1/08* (2006.01)
(Continued)

(52) U.S. Cl.
CPC ............... *B09C 1/02* (2013.01); *B02C 23/08* (2013.01); *B03B 5/48* (2013.01); *B03B 9/00* (2013.01);
(Continued)

(58) Field of Classification Search
CPC ....... B09C 1/002; B09C 1/08; B09C 2101/00; B09C 1/02; G21F 9/001; G21F 9/30;
(Continued)

(56) References Cited

U.S. PATENT DOCUMENTS 3,086,718 A * 4/1963 Lukas, Jr. ............... B03C 1/30
                                                       241/24.14
3,885,744 A * 5/1975 Drage .................... B02C 23/14
                                                       241/23
(Continued)

FOREIGN PATENT DOCUMENTS

RU    2108174    4/1998
RU    2160165    12/2000
(Continued)

OTHER PUBLICATIONS

"Decontamination of contaminated soil at National Research Centre Kurchatov Institute"; by Volkov V.G. et. al; Atomic Energy, 2007, v.103, issue 6, p. 381-387.
(Continued)

*Primary Examiner* — Benjamin F Fiorello
*Assistant Examiner* — Edwin J Toledo-Duran
(74) *Attorney, Agent, or Firm* — Dmitry S. Kryndushkin, IP Center Skolkovo

(57) ABSTRACT

The invention is intended for integrated decontamination of soils contaminated with mercury (amalgam) or/and radionuclides. Method for soil decontamination includes preparation of pulp by mixing soils with water at the soil sampling
(Continued)

point with separation of fraction with fragments more than 100 mm in the pulp preparation module, disintegration of pulp and soil aggregates in the disintegration module with separation of plants residues and fraction with fragments more than 10 mm. Pulp thickening. In the hydroclassification module the pulp is separated into sand and fine particle fractions, the fine particle fraction goes to the dehydration module, designed as a concentrator, where it is thickened and dehydrated for further disposal. If mercury and amalgam are present in soils they are separated in the thickening module. Technical result—implementation of a low-waste nonchemical technology for decontamination of soil from mercury, its water-insoluble forms, amalgam or/and radionuclides in a single technological process without equipment resetting, separation of metal mercury or its amalgam.

4 Claims, 1 Drawing Sheet

(51) Int. Cl.
*B09C 1/02* (2006.01)
*B03B 9/00* (2006.01)
*G21F 9/30* (2006.01)
*G21F 9/00* (2006.01)
*B02C 23/08* (2006.01)
*B03B 5/48* (2006.01)

(52) U.S. Cl.
CPC .............. *G21F 9/001* (2013.01); *G21F 9/008* (2013.01); *G21F 9/30* (2013.01)

(58) Field of Classification Search
CPC .. G21F 9/008; B03B 5/48; B03B 9/00; B02C 23/08
USPC ....... 75/142; 588/236; 209/167; 405/128.45, 405/128.5, 128.75
See application file for complete search history.

(56) References Cited

U.S. PATENT DOCUMENTS

| | | | | |
|---|---|---|---|---|
| 5,056,541 A | * | 10/1991 | Schade | B03D 1/02 134/10 |
| 5,183,499 A | * | 2/1993 | Chintis | B03B 5/74 405/128.7 |
| 5,244,492 A | * | 9/1993 | Cyr | C22B 43/00 209/167 |
| 5,266,494 A | * | 11/1993 | Lahoda | B09C 1/02 134/10 |
| 5,490,907 A | * | 2/1996 | Weinwurm | B09C 1/06 159/47.3 |
| 5,516,968 A | | 5/1996 | Abel | |
| 6,015,498 A | * | 1/2000 | Gleizes | B01D 15/00 210/688 |
| 6,102,053 A | * | 8/2000 | Van De Steeg | B09C 1/00 134/13 |
| 6,120,579 A | * | 9/2000 | El-Shoubary | C22B 43/00 423/109 |
| 6,464,430 B1 | | 10/2002 | Maleck | |
| 7,416,668 B1 | * | 8/2008 | Theodore | C02F 3/302 210/173 |
| 2006/0140725 A1 | * | 6/2006 | Benjamin | B03B 9/02 405/128.7 |
| 2013/0331632 A1 | * | 12/2013 | Drake | B01D 3/009 585/802 |

FOREIGN PATENT DOCUMENTS

| | | |
|---|---|---|
| RU | 2275974 | 5/2006 |
| RU | 81107 | 3/2009 |
| RU | 2388084 | 4/2010 |
| RU | 134452 | 11/2013 |
| WO | 1997010063 | 3/1997 |

OTHER PUBLICATIONS

"Non-waste development of combined natural and man-made deposits by mobile mining and processing systems"; by VN Anisimov, president of "Ecological Resources" NPC, academician of the National Academy of Agrarian Sciences, MANEB; Mining industry. 2009. No. 4. p. 42-49.

"Ecogeochemistry of mercury and demercurization methods of solid mercury-containing wastes on South Siberia area (as an example the industrial zone of the Novosibirsk Plant of Chemical Concentrates is described)"; Chemistry for sustainable development. 2012. No. 25. p. 531-542.

"Soil washing for metal removal: a review of physical/chemical technologies and field applications"; Journal of hazardous materials. 2008. No. 152. p. 1-31.

"Soil washing for volume reduction of radioactively contaminated soils"; Journal Remediation. 1993. V. 3. No. 3. p. 327-344.

"The Boskalis Dolman Mobile Soil Washing Plant"; [Electronic resourse] https://environmental.boskalis.com/.

* cited by examiner

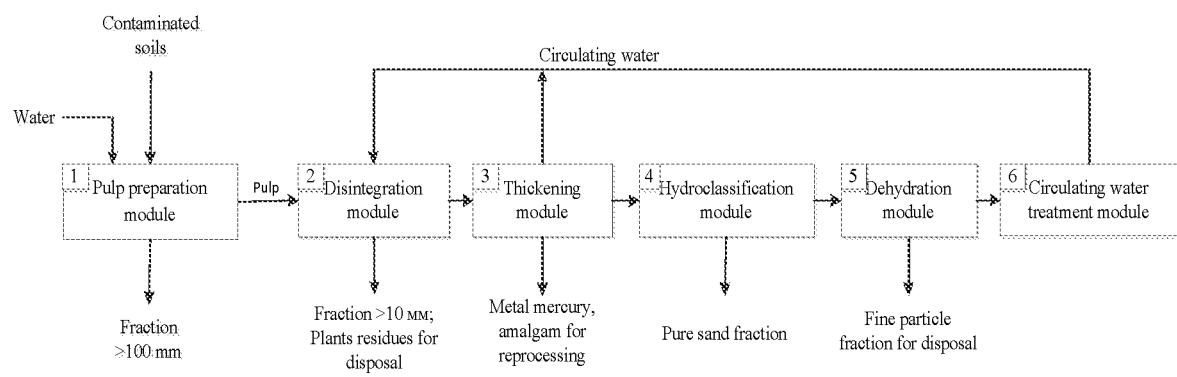

METHOD FOR DECONTAMINATING SOIL, AND INSTALLATION FOR IMPLEMENTING SAME

BACKGROUND

The invention is intended for integrated decontamination of soils contaminated with mercury (amalgam) and/or radionuclides. The invention provides fractioning of soils for pure coarse- and medium disperse (sand) fractions, as well as fine particle fractions containing water-insoluble forms of mercury or/and radionuclides, and extraction of metal mercury or its amalgam.

Industrial accidents of various nature, decommissioning and dismantling of nuclear fuel cycle facilities and other sectors of industry lead to emerging of territories with soils contaminated with heavy metals, including radionuclides and mercury. Getting into the environment, radionuclides participate in migration processes, having a long-term negative impact on ecosystems. Soils contaminated with metal mercury are no less hazardous: toxic vapour, high probability of their convective transfer and, as a result—subsequent precipitation and contamination of adjacent and remote areas. Therefore, there is a need to develop reliable high-performance methods for soil decontamination with subsequent remediation of contaminated territories.

There is a known patent No. RU2160165 « Process line for reprocessing of metal-bearing sands with gravity concentrator», pub. 10.12.2000, for enrichment of refractory gold ores and alluvial deposits with subsequent extraction of metal mercury.

The process line for reprocessing of metal-bearing sands includes disintegrating classifier, initial enrichment device, gravity concentrator, collectors, pumping system, concentrator, device for mercury distillation in the closed cycle, device for gold melting with absorber. The collector of initial enrichment is equipped with amalgamation holders and device for repositioning of holders. The pumping system provides supply of heavy minerals of initial enrichment stage after their amalgamation to the distributor of pulp flows of the gravity concentrator with multi-radius few-row flow-forming surface with riffles, with chequer-wise shift of flows at the output, equipped with magnets installed in front of the flow shifting space at the output, collector of mineral inclusions sorbing mercury, and collector of magnetic fraction equipped with amalgamation holders with automatic device to control holders.

Invention disadvantages—the proposed method and the device do not provide decontamination of soils from heavy metals, such as radionuclides and mercury.

There is a mobile complex for reprocessing and disposal of industrial wastes from precious metal plants, coal cleaning plant (disposed area, sludge depositories) etc., which along with precious metals may contain radionuclides, mercury (amalgam) and other heavy metals (Mining industry, 2009, No. 4, p. 42-49),
which includes the following procedures:
removal of coarse fraction (more than 50 mm);
removal of fraction from 2 to 50 mm and preparation of pulp from the remaining material by mixing it with circulating water;
disintegration of soil aggregates, dispersion of pulp;
hydroclassification of pulp to receive fine particle fractions and sand fractions being a mixture of minerals, precious metals, metal mercury, including amalgam, as well as other heavy metals;
concentration of sand fractions and extraction of precious metals, metal mercury, including amalgam, as well as other heavy metals;
settling, flocculation and thickening of fine particle fraction received at hydroclassification and concentration stages by adding flocculent;
treatment of circulating water from coarse dispersion and soluble forms of heavy metals.

Thickened fine particle fraction received by reprocessing is sent for recycling. Contaminants extracted at the stage of circulating water treatment are sent for storage and disposal of radioactive waste or toxic substances.

Invention Disadvantages:
extraction of metal mercury (amalgam) after pulp hydroclassification that can lead to its getting into pure fractions;
use of chemical agents for thickening of the fine particle fraction increases volume of rinse waters and consequently material costs;
the method is not appropriate for decontamination of soils because of significant differences between their mineralogic and grain-size compositions and waste compositions of enrichment plants.

The closest method and soil decontamination facility in terms of technical principle and result (the prototype), reached while applying the method (Atomic Energy, 2007, V. 103, Pub. 6, p. 381-387), includes the following procedures:
soil sampling from contaminated territories;
separation of fraction more than 100 mm;
disintegration (destruction) of soil aggregates and preparation of pulp;
separation of fraction from 3 to 100 mm and fraction less than 3 mm;
hydroclassification (water-gravity separation) of pulp into sand and fine particle fractions with the size of particles more than 0.1 mm and less than 0.1 mm respectively;
flocculation using chemical agents, thickening, dehydration of fine particle fraction;
treatment of circulating water.
disposal of dehydrated fine particle fraction containing radionuclides.

Sand and coarse (more than 3 mm) fractions can be returned to the soil sampling point.

The facility is composed of modules:
disintegration module provides separation of fraction more than 100 mm, destruction of soil aggregates, preparation of pulp, separation of fraction from 3 to 100 mm and fraction less than 3 mm;
hydroclassification module provides separation of pulp into sand and fine particle fractions with the size of particles more than 0.1 mm and less than 0.1 mm respectively;
thickening module provides thickening of fine particle fraction by adding corresponding agent;
dehydration module (according to the prototype text—filtration) provides removal of excessive moisture from fine particle fraction by press filter;
circulating water treatment module provides separation of fine organo-mineral suspended solids and radionuclides.

Disadvantages of the Invention:
application of chemical agents for thickening of fine particle fraction increases the volume of rinse waters and consequently costs of process;

mercury gets into the sand fraction in the form of fine drops during decontamination of mercury-containing soils.

SUMMARY

Technical effect of the proposed invention:
creation and implementation of a low-waste nonchemical technology for soil decontamination from mercury, its water-insoluble forms, amalgam or/and radionuclides within a single technological process without equipment resetting;
reduction of volume of soil fractions subject to disposal or recycling;
returnability of pure fractions to the economic turnover;
minimization of secondary wastes amount due to continuous closed-cycle operation of the facility;
increase the efficiency of soil decontamination by extraction of metal mercury (amalgam) at the initial stage of reprocessing, as well as concentration of water-insoluble forms of mercury in the fine particle fraction;
creation of an environmentally-friendly technology, which prevents mercury and its compounds from getting into pure fractions, sludge pits, disposal areas etc., and respectively, into the environment;
an opportunity to use the extracted metal mercury and amalgam as raw material to have a marketable product.

For this purpose there is a method for soil decontamination from contaminants, which includes preparation of pulp by mixing soil with water, extraction of fraction with fragment size more than 100 mm and more than 10 mm, disintegration of soil aggregates, hydroclassification of pulp into sand and fine particle fractions with extraction of the sand fraction, dewatering and dehydration of fine particle fraction with its further disposal and treatment of circulating water, at that the pulp is prepared by mixing of contaminated soils with water at the soils sampling site with separation of fraction with fragments more than 100 mm, after separation of fraction with fragments more than 10 mm during disintegration, there is additional pulp dewatering; separation of fraction with fragments more than 10 mm provides separation of plants residues, but dewatering and dehydration of the fine particle fraction is done in one stage by its concentration.

In addition:
metal mercury (amalgam) is extracted during additional thickening of pulp.
fine particle fraction, containing water-insoluble forms of mercury and/or radionuclides, is subject to disposal.

Also, to reach the mentioned results there is a facility for soil decontamination consisting of modules integrated into a single technological process. The facility includes modules of disintegration, hydroclassification, dehydration of the fine particle fraction, treatment of circulating water. At that the facility has an additional module for pulp preparation with a function to separate fraction with fragments more than 100 mm and thickening module located before hydroclassification module; disintegration module is additionally equipped with a device to separate plants residues, and module for dehydration of the fine particle fraction is designed as a concentrator.

Besides, thickening module is equipped with a device to separate metal mercury and amalgam, and the concentrator has a device to separate fine particle fraction containing water-insoluble forms of mercury and/or radionuclides.

BRIEF DESCRIPTION OF THE DRAWINGS

The FIG. 1 shows the basic scheme of the soil decontamination facility for the case of mixed contamination, which includes
1—pulp preparation module,
2—disintegration module,
3—thickening module,
4—hydroclassification module,
5—dehydration module,
6—circulating water treatment module.

DETAILED DESCRIPTION

The facility consists of modules 1-6 connected according the technological process by pipelines with installed valves, and instrumentation, pumps (not given in the FIG. 1).

The facility operates as follows.

Mix contaminated soils with water and separate coarse fractions (>100 mm): construction debris, bricks, concrete etc. at the soil sampling point in pulp preparation module 1. Coarse fractions (>100 mm) remain at the soil sampling point.

Then the pulp goes to disintegration module 2, where, for example, using scrubbers happens separation of fractions more than 10 mm and plants residues. The separated fractions are sent for recycling. The module also provides pulp dispersion by its vigorous mixing.

Then the pulp goes to thickening module 3. For decontamination of soils containing mercury or mixed contamination (mercury and radionuclides) the module can be designed, for example, as a concentrator and equipped with a device to remove metal mercury (amalgam). Separated metal mercury and amalgam are collected into a leak-tight container and sent for reprocessing. For decontamination of radionuclide-contaminated soils module 3 provides pulp thickening.

The pulp from module 3 goes to hydroclassification module 4, where it is divided into sand and fine particle fraction enriched with water-insoluble forms of mercury or/and radionuclides. Hydroclassification module 4, for example, can be designed as a mechanical classifier (screw-type, centrifugal etc.). The sand fraction is sent for recycling, the fine particle fraction—to dehydration module 5, designed as a concentrator. Dehydrated fine particle fraction, contaminated with water-insoluble forms of mercury or/and radionuclides, is collected into leak-tight containers and sent for disposal, and clarified circulating water—to circulating water treatment module 6. Treated circulating water is then returned to the cycle.

Example 1 (According to the Prototype)

Contaminated soils with moisture 12.5% and mercury concentration 300 mg/kg are collected and sent to the decontamination point.

Mercury-containing soils (1000 kg) are loaded into the disintegration module, mixed with water, and afterwards the pulp is subject to subsequent separation of fractions more than 100 mm and more than 10 mm. Mercury content in the extracted fractions does not exceed 2.1 mg/kg—MAC for soils. Then the pulp goes to the hydroclassificaiton module, where it is separated into the sand fraction (>0.04 mm) and the fine particle fraction (<0.04 mm). After dehydration the fine particle fraction with mercury concentration ~450 mg/kg is collected into leak-tight containers for further disposal. The sand fraction with mercury concentration ~360 mg/kg is sent for repeated decontamination.

Fractions separated during decontamination of mercury-containing soils:

| | |
|---|---|
| coarse (>10 mm and >100 mm) | 10.5% wt. |
| sand (>0.04 mm) | 52% wt. |
| fine particles (<0.04 mm) | 25% wt. |

Based on the results of soil decontamination according to the prototype diagram the sand fraction, having the maximum content, requires repeated decontamination due to high mercury content. It should be noted that the process of pulp separation does not allow to extract plants residues.

Example 2

Mix contaminated soils (1000 kg), described in example 1, with water at the sampling point and separate fractions more than 100 mm in the pulp preparation module 1. After the pulp goes to disintegration module 2. Here happens separation of fraction, which is more than 10 mm. Mercury content in fractions with components more than 10 mm and 100 mm—does not exceed 2.1 mg/kg. Disintegration module 2 provides separation of plants residues with mercury concentration not more than 2.1 mg/kg. After disintegration module the pulp goes to thickening module 3, where it is thickened to extract metal mercury (amalgam). The amount of mercury extracted in this module equals to ~220 g. Then in hydroclassification module 4 the thickened pulp is separated into the sand fraction with particles more than 0.04 mm and the fine particle fraction with particles less than 0.04 mm. Mercury concentration in the sand fraction, sent for recycling, does not exceed 2.1 mg/kg. The fine particle fraction with mercury content of 300 mg/kg is dehydrated in module 5, packed in leak-tight containers and sent for disposal. Water goes to circulating water treatment module 6 and returns to the cycle.

Fractions separated during decontamination of mercury-containing soils:

| | |
|---|---|
| coarse (>10 mm and >100 mm) | 9% wt. |
| plants residues | 1.5% wt. |
| sand (>0.04 mm) | 52% wt. |
| fine particles (<0.04 mm) | 25% wt. |

Mercury content in the facility circulating water does not exceed MAC values for water bodies of household water use (0.0005 mg/l).

Example 3

Decontamination of soils (1000 kg) with specific activity of $^{137}$Cs 8.0 kBq/kg, moisture—14%. Mix soils with water in pulp preparation module 1 and separate fraction more than 100 mm, which remains at the soils sampling point. The prepared pulp goes to disintegration module 2 to separate fraction more than 10 m, plants residues, dispersion. Then the pulp goes to thickening module 3. The thickened pulp is decontaminated similar to example 2.

Fractions separated during decontamination:

| | |
|---|---|
| coarse (>10 mm and >100 mm) | 7% wt. |
| plants residues | 1% wt. |
| sand (>0.04 mm) | 58% wt. |
| fine particles (<0.04 mm) | 20% wt. |

Specific activity of coarse fractions equals to 0.12 kBq/kg, plants residues—0.1 kBq/kg, sand fraction—0.87 kBq/kg. Fine particle fraction with specific activity ~37.4 kBq/kg is sent for disposal.

Example 4

Decontamination of soils (1000 kg) contaminated with radionuclides and mercury (mixed contamination). Moisture of soils equals to 12.5%, mercury concentration—300 mg/kg, $^{137}$Cs specific activity—3.0 kBq/kg. After pulp preparation and separation of fraction more than 100 mm the pulp goes to the disintegration module. The pulp is decontaminated similar to example 2.

Fractions separated during decontamination:

| | |
|---|---|
| coarse (>10 mm and >100 mm) | 9% wt. |
| plants residues | 1.5% wt. |
| sand (>0.04 mm) | 52% wt. |
| fine particles (<0.04 mm) | 25% wt. |

Mercury content in coarse, sand fractions, as well as plants residues does not exceed 2.1 mg/kg. Specific activity of coarse fractions—0.16 kBq/kg; plants residues—0.1 kBq/kg; sand fraction—0.3 kBq/kg. Mercury amount in the thickening module equals to ~220 g. Mercury concentration in the clay fraction equals to 300 mg/kg, and specific activity ~11.3 kBq/kg.

Content of mercury and radionuclides in the facility circulating water does not exceed standard values.

By specific sequence of procedures and binding of modules the announced invention provides separation of mercury (amalgam), or radionuclides, or mixed contamination (mercury and radionuclides) from soils without resetting the operating procedures. The invention provides separation of pure fractions (sand, coarse) and plants residues, which can be returned to the economic turnover. The most contaminated fine particle fraction is subject to disposal. Extraction of elemental mercury (amalgam) from soils with mercury and mixed contamination in the thickening module prevents metal from getting in sand fractions, and consequently to the environment.

The invention claimed is:

1. A nonchemical method for soil decontamination from contaminants, including metal mercury, amalgams, water-insoluble forms of mercury and radionuclides, comprising the following steps:
   (a) preparing a pulp by mixing said contaminated soil with water;
   (b) separating away a fraction with fragments more than 100 mm in diameter and a fraction with fragments more than 10 mm in diameter from said pulp;
   (c) disintegrating soil aggregates having size around or less than 10 mm in diameter that remain in the pulp after step (b);
   (d) dewatering disintegrated soil aggregates by means of a first concentrator and separating away metal mercury and amalgams;
   (e) performing hydroclassification of the pulp after step (d), said pulp contains water-insoluble forms of mercury or radionuclides, or both, to separate the pulp into a sand fraction with a particle size greater than 0.04 mm in diameter and a fine particle fraction with a particle size less than 0.04 mm in diameter;

(f) dewatering the fine particle fraction in one stage by use of a second concentrator;

(g) disposing the dehydrated fine particle fraction containing water-insoluble forms of mercury or radionuclides, or both, obtained after step (f), wherein during all steps of the method no chemical substances have been added.

2. A facility for soil decontamination from contaminants, including metal mercury, amalgams, water-insoluble forms of mercury and radionuclides, by the nonchemical method of claim 1, comprising the following modules integrated into a single technological process and connected sequentially by pipelines: a pulp preparation module, a disintegration module, a thickening module, a hydroclassification module and a dehydration module, wherein the pulp preparation module is configured to prepare a pulp by mixing said contaminated soil with water and separate away fractions with fragments more than 100 mm in diameter and more than 10 mm in diameter, and is optionally configured to separate plants residues; the disintegration module is configured to disintegrate residual soil aggregates having size around or less than 10 mm in diameter that are present in the pulp after transferring from the pulp preparation module; the thickening module is configured to dewater disintegrated soil aggregates by means of a first concentrator and separating away metal mercury and amalgams; the hydroclassification module is configured to separate the pulp that was transferred from the disintegration module, said pulp contains water-insoluble forms of mercury or radionuclides, or both, into sand fractions with a particle size greater than 0.04 mm in diameter and fine particle fractions with a particle size less than 0.04 mm in diameter; and the dehydration module contains a second concentrator and is configured to separate and dispose said fine particle fractions containing water-insoluble forms of mercury or radionuclides, or both.

3. The method of claim 1, wherein mixing soil with water in step (a) occurs at a soil sampling point.

4. The facility of claim 2, wherein additional circulating water treatment module is functionally connected after the dehydration module, providing extraction of contaminants.

* * * * *